United States Patent
Hamilton, II et al.

(10) Patent No.: US 8,676,975 B2
(45) Date of Patent: Mar. 18, 2014

(54) VIRTUAL UNIVERSE DESKTOP EXPLORATION FOR RESOURCE ACQUISITION

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/120,791

(22) Filed: May 15, 2008

(65) Prior Publication Data

US 2009/0287765 A1    Nov. 19, 2009

(51) Int. Cl.
*G06F 15/173*    (2006.01)
*G06F 15/16*    (2006.01)

(52) U.S. Cl.
USPC ........................................ 709/226; 709/203

(58) Field of Classification Search
USPC .................................................. 709/203, 226
See application file for complete search history.

(56) References Cited

U.S. PATENT DOCUMENTS

| | | | |
|---|---|---|---|
| 6,119,147 A | 9/2000 | Toomey et al. | |
| 6,381,613 B1 | 4/2002 | Gallery et al. | |
| 6,421,047 B1 | 7/2002 | de Groot | |
| 6,493,001 B1 | 12/2002 | Takagi et al. | |
| 6,549,933 B1 | 4/2003 | Barrett et al. | |
| 6,772,195 B1 | 8/2004 | Hatelid et al. | |
| 7,084,876 B1 | 8/2006 | Fogel et al. | |
| 7,115,034 B2 | 10/2006 | Kuwahara | |
| 8,161,397 B2 | 4/2012 | Kalasapur et al. | |
| 2002/0054129 A1 | 5/2002 | Heron et al. | |
| 2002/0113820 A1 | 8/2002 | Robinson et al. | |
| 2003/0014423 A1 | 1/2003 | Chuah et al. | |
| 2003/0054882 A1 | 3/2003 | Suzuki | |
| 2004/0266505 A1 | 12/2004 | Keam et al. | |
| 2005/0086612 A1 | 4/2005 | Gettman et al. | |
| 2005/0117215 A1 | 6/2005 | Lange | |
| 2005/0137015 A1 | 6/2005 | Rogers et al. | |
| 2005/0140668 A1 | 6/2005 | Hlavac et al. | |
| 2006/0136964 A1* | 6/2006 | Diez et al. ....................... 725/37 |
| 2006/0178968 A1 | 8/2006 | Jung et al. | |
| 2007/0035561 A1 | 2/2007 | Bachelder et al. | |
| 2007/0132752 A1 | 6/2007 | Stacy | |
| 2008/0065514 A1 | 3/2008 | Eaton | |
| 2008/0141147 A1* | 6/2008 | Buhrke et al. ................. 715/757 |
| 2009/0083051 A1 | 3/2009 | Bokor et al. | |

(Continued)

OTHER PUBLICATIONS

FAQs From Croquet Consortiun, http://www.croquetproject.org?index.php/FAQs, retrieved from the World Wide Web Mar. 19, 2008.

(Continued)

*Primary Examiner* — David X Yi
(74) *Attorney, Agent, or Firm* — Lisa Ulrich; Hoffman Warnick LLC

(57) ABSTRACT

The present invention is directed to a system, method and program product that allows a user to acquire resources from a local computer during a session with a virtual universe. Disclosed is a system that allows a user to: invocate a local operating system session that displays an operating system interface onto a client computer during a virtual universe session; navigate the operating system interface using an avatar; and acquire resources from the client computer via the operating system interface using the avatar.

10 Claims, 3 Drawing Sheets

(56) References Cited

U.S. PATENT DOCUMENTS

| | | |
|---|---|---|
| 2009/0083501 A1 | 3/2009 | Friauf et al. |
| 2009/0089685 A1 | 4/2009 | Mordecai et al. |
| 2009/0106347 A1* | 4/2009 | Harwood et al. ............. 709/203 |
| 2009/0106671 A1 | 4/2009 | Olson et al. |
| 2009/0165140 A1 | 6/2009 | Robinson et al. |
| 2009/0210483 A1 | 8/2009 | Pierce et al. |
| 2009/0227368 A1 | 9/2009 | Wyatt |
| 2009/0249244 A1* | 10/2009 | Robinson et al. ............. 715/781 |
| 2009/0271422 A1 | 10/2009 | Finn et al. |
| 2010/0030578 A1 | 2/2010 | Siddique et al. |

OTHER PUBLICATIONS

Project Looking Glass by Sun Microsystems: Open Platform to Explore Innovative 3D User Interface, http://www.sun.com/software/looking_glass/, retrieved from the World Wide Web Mar. 19, 2008.

WAQAS, U.S. Appl. No. 12/134,850, Office Action Communication, Sep. 1, 2010, 23 pages.

WAQAS: U.S. Appl. No. 12/134,850, Final Office Action, Nov. 28, 2012, 34 pages.

WAQAS, U.S. Appl. No. 12/134,850, Office Action Communication, Oct. 28, 2011, 21 Pages.

Yi, U.S. Appl. No. 12/131,581, Office Action Communication, Aug. 20, 2012, 15 pages.

WAQAS, U.S. Appl. No. 12/134,850, Office Action Communication, Jun. 19, 2012, 31 Pages.

WAQAS, U.S. Appl. No. 12/134,850, Office Action Communication, Feb. 14, 2012, 26 pages.

Yi, U.S. Appl. No. 12/131,581, Office Action Communication, Mar. 14, 2012, 23 pages.

WAQAS, Office Action Communication for U.S. Appl. No. 12/134,850 dated Feb. 2, 2011, 21 pages.

* cited by examiner

VIRTUAL UNIVERSE DESKTOP EXPLORATION FOR RESOURCE ACQUISITION

FIELD OF THE INVENTION

The present invention relates to virtual environments, and more specifically relates to a system, method and program product for providing a virtual universe in which the user can explore and acquire resources from a local computer desktop.

BACKGROUND OF THE INVENTION

A virtual environment is an interactive simulated environment accessed by multiple users through an online interface. Users inhabit and interact in the virtual environment via avatars, which are two or three-dimensional graphical representations of humanoids. There are many different types of virtual environments, however there are several features many virtual environments generally have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual environments (e.g., universes, worlds, etc.), such as that provided in the on-line world Second Life (Second Life is a trademark of Linden Research in the United States, other countries, or both). The Second Life client program provides its users (referred to as residents) with tools to view, navigate, and modify the Second Life world and participate in its virtual economy.

Second Life and other on-line virtual environments present a tremendous new outlet for both structured and unstructured virtual collaboration, gaming and exploration, as well as real-life simulations in virtual spaces. These activities, along with yet to be disclosed new dimensions, in turn provide a wide open arena for creative and new communication methods and mechanisms.

As virtual environments become more involved, there may be occasions when it becomes desirable to bring resources (e.g., files, programs, media, etc.) into the virtual environment. For example, an avatar may wish to add a program to its inventory that performs some function for the avatar. Current approaches do not provide an effective mechanism for achieving this task. In view of the foregoing, there exists a need for an approach that addresses at least one of the deficiencies of the related art.

SUMMARY OF THE INVENTION

The present invention provides a system for acquiring resources from a client computer during a session with a virtual universe. The present invention allows users of a virtual universe client to acquire, manipulate, and/or interact with the external resources of the local computer from within the virtual universe client. The invention thus allows access to resources, such as files, images, programs, business documents, etc., during a virtual universe session. Once accessed, those resources can be brought back to the virtual universe so they may be utilized or otherwise manipulated from within the virtual universe.

A first aspect of the present invention is directed to a system for acquiring resources from a client computer during a session with a virtual universe, comprising: a system for invocating a local operating system session that displays an operating system interface onto a client computer during a virtual universe session; a system for navigating the operating system interface using avatar controls; a system for acquiring resources from the client computer via the operating system interface using the avatar controls; and a system for managing acquired resources upon return to the virtual universe session.

A second aspect of the present invention is directed to a method for acquiring resources from a client computer during a session with a virtual universe, comprising: invocating a local operating system session that displays an operating system interface onto a client computer during a virtual universe session; navigating the operating system interface using avatar controls; acquiring resources from the client computer via the operating system interface using the avatar controls; and managing acquired resources upon return to the virtual universe session.

A third aspect of the present invention is directed to a program product stored on a computer readable medium for acquiring resources from a client computer during a session with a virtual universe, comprising: program code for invocating a local operating system session that displays an operating system interface onto a client computer during a virtual universe session; program code for navigating the operating system interface using avatar controls; program code for acquiring resources from the client computer via the operating system interface using the avatar controls; and program code for managing acquired resources upon return to the virtual universe session.

A fourth aspect of the present invention is directed to a method for deploying an application for acquiring resources from a client computer during a session with a virtual universe, comprising: providing a computer infrastructure being operable to: invoke a local operating system session that displays an operating system interface onto a client computer during a virtual universe session; navigate the operating system interface using an avatar; acquire resources from the client computer via the operating system interface using the avatar; and manage acquired resources upon return to the virtual universe session.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
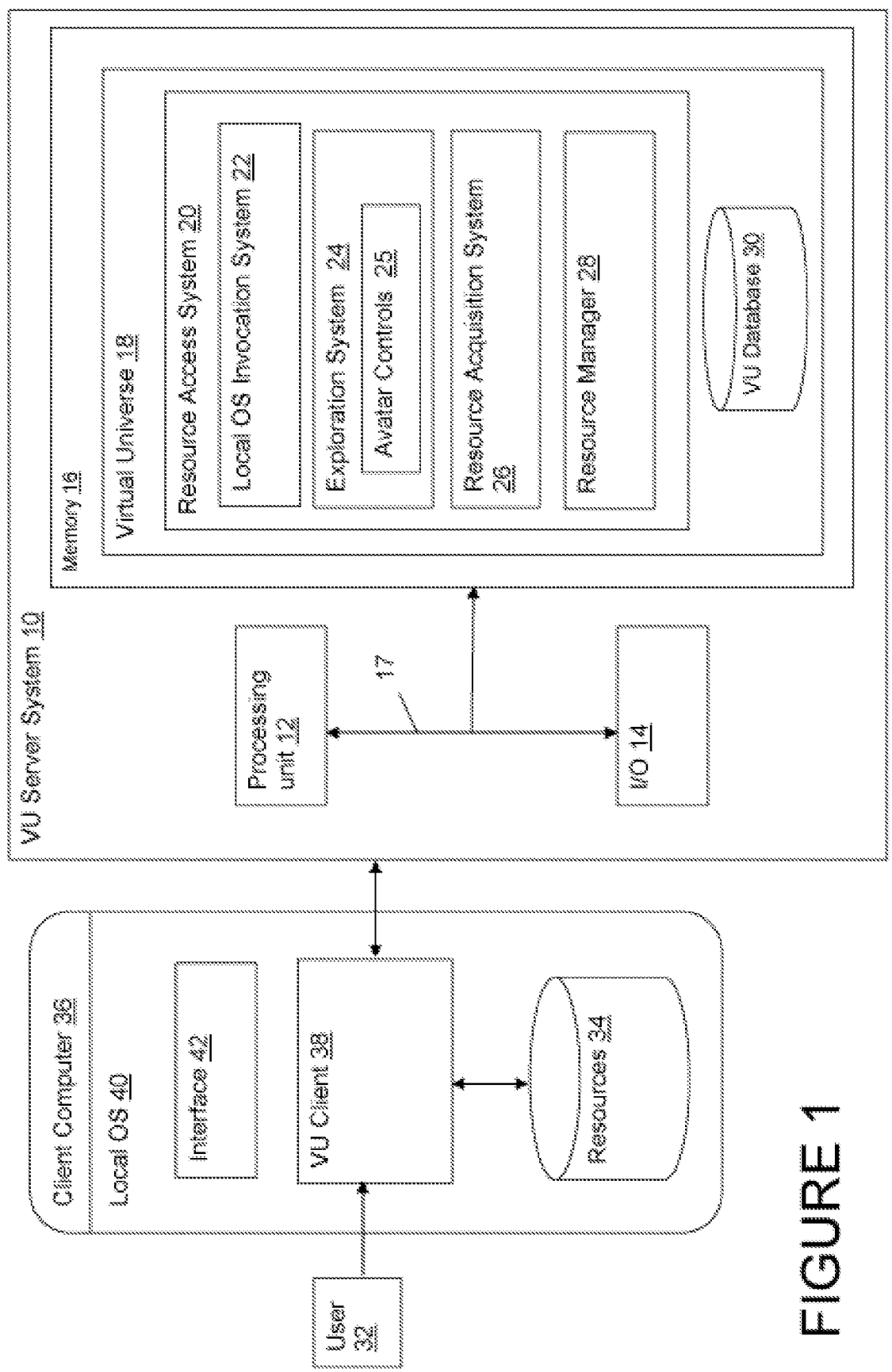
FIG. 1 depicts a virtual universe computing platform in accordance with an embodiment of the present invention.

Referring now to the drawings, FIG. 1 depicts a virtual universe infrastructure that includes a virtual universe (VU) server system 10 for implementing and serving a virtual universe 18 over a network, and a client computer 36 for providing access for a user 32 to the virtual universe 18. In general, user 32 accesses virtual universe 18 from a local operating system (OS) 40 on a client computer 36 that is running a virtual universe (VU) client 38. Client computer 36 may comprise any type of computing device, e.g., a personal computer, a laptop, a handheld device, etc., that provides a local OS 40 from which resources 34 associated with the client computer 36 can be accessed. Local OS 40 may comprise any type of now known or later developed operating system.

Within virtual universe 18 is a resource access system 20 that allows a user's avatar participating in virtual universe 18 to explore and acquire resources 34 from the local OS 40 (and vice versa). As described below, resource access system 20 melds virtual universe style computing with traditional desktop oriented computing by allowing the user's avatar to escape from the virtual universe 18 onto the interface 42 (e.g., desktop) of the client computer's local OS 40. From the interface 42, the avatar can acquire resources 34 such as files, application text, images, programs, etc., and then import them into the VU 18.

To implement this process, resource access system 20 includes: a local OS invocation system 22; an exploration system 24; a resource acquisition system 26; and a resource manager 28. Note that in this illustrative embodiment, components of resource access system 20 are shown residing within VU server system 10. However, it is understood that some or all of these modules may be implemented locally by VU client 38.

Local OS invocation system 22 comprises a request mechanism that allows user 32 to effectively leave the virtual universe 18 (i.e., pause the virtual universe session) and launch a local OS session that displays the interface 42 associated with the local OS 40. In one illustrative embodiment, the interface 42 comprises a desktop, such as that shown in FIG. 2. The request mechanism can be implemented in any fashion, e.g., by selecting an action from a menu, selecting an item from the avatar's inventory, initiating the action by selecting an object rendered within the virtual universe 18, etc.

Once the user 32 has invoked the local OS 40, the VU client 38 presently being rendered by the client computer 36 can be minimized or otherwise hidden, and interface 42 can be displayed. In the case where the interface 42 comprises a desktop, the desktop is displayed and the user's avatar from the virtual universe 18 may be rendered on the desktop.

Exploration system 24 provides the mechanism for interacting with the local OS 40 via avatar controls 25. Avatar controls 25 provide the rendering, motions, and movements of the avatar within the interface 42. Thus, although the virtual universe session is paused, control of the avatar is still intact within the interface 42 associated with local OS session being displayed on the client computer. Avatar controls 25 may be implemented by the VU client 38 or a program written to interact with both the local OS 40 and the VU client 38. While the avatar's rendering is typically always visible, exploration system 24 could be implemented using some technique other than an avatar (e.g., a two dimensional pointer, a voice interaction system, etc.).

User 32 may control the rendered avatar on the local OS's interface 42 by using known methods for controlling avatars such as using pointing devices or a keyboard. In the case where the interface 42 comprises a desktop, the avatar makes the corresponding movement on the desktop in response to a movement request from an input device. It should be noted that while the avatar is rendered on the desktop, the user is allowed to perform the full range of interactions with the desktop, such as opening directories, starting applications, deleting files, etc.

Resource acquisition system 26 provides the mechanism for allowing the avatar to capture resources 34 from the client computer 36, which can then be brought back to the virtual universe 18. Illustrative processes for acquiring resources include, e.g., the following:

(1) Dragging files from a file system explorer onto the avatar. That file and its contents are then made available when the avatar returns to the virtual universe 18.

(2) Copying text from an application into an operating system's short-term anonymous data store (i.e., clipboard). The avatar is selected, and then an operating system dependant input device operation is performed to send the contents of the data store to the avatar (i.e., pasting in most operating systems). The textual contents of the short-term anonymous data store are then available when the avatar returns to the virtual universe 18.

(3) Loading graphics in a graphical editing program. Part or all of an image can be selected and copied into the operating system's short-term anonymous data store. An operating system dependant input device operation can then be performed to send that content to the avatar. The graphical image of the short-term anonymous data store is potentially converted to a known format within the virtual universe 18, and then made available when the avatar returns to the virtual universe 18.

(4) Dragging a URL from the location bar within a web browser onto the avatar. The contents of that web page, including images and a rendering of that web page can then be made available within the virtual universe 18.

It should be appreciated that the above actions are only illustrative and are not intended to assert or imply any limitation with regard to the environments in which different embodiments may be implemented. Many modifications to the type, scope, or invocation of acceptable actions may be made.

The desktop avatar may acknowledge that it has received a resource 34 from the local OS 40. An illustrative list of acknowledgements include: the avatar placing a graphical representation of the item into a knapsack/briefcase/other physical embodiment one might put items into; a textual bubble appearing around the avatar indicating with text or graphics that a resource has been acquired; a potentially unique sound that user 32 will associate with resource acquisition (e.g., knapsack zipper being opened and closed, sound of typing on a typewriter if a textual resource was acquired, a camera shutter if an image was acquired, etc); etc.

Typically, user 32 will eventually want to return to the virtual universe 18, potentially with their newly acquired resources. Illustrative methods of returning to the virtual universe 18 include, but are not limited to: a key sequence, a context menu with a "return action" when the context menu is invoked upon the avatar, a "hot" region of the screen that represents an exit to the virtual universe 18, etc. Once the appropriate action takes place indicating a desire to return, the local OS session can be terminated, and the virtual universe session can be re-established on the client computer 36.

Upon return to the virtual universe 18 or upon user request, resource manager 28 manages any resources 32 acquired by the avatar from client computer 36. In the case where the resources are large objects that might take a long time to upload to the VU database, the transfer of objects can be done by a separate background process, e.g., at the moment of selection, after selecting a specific batch, when the total file size exceeds 1 MB, etc. In these cases, the user may want to send some files to the VU while still browsing the desktop.

Acquired resources may be made available to the user 32 within the virtual universe 18 in any number of ways. For example, one embodiment may have resource manager 28 automatically place the acquired resources into the avatar's inventory. Another embodiment may prompt the user 32 upon return to the virtual universe 18 or upon user request for locations for the new resources. Yet still, a different embodiment may keep the items in a virtual knapsack and require the user to remove items from the knapsack and place within the virtual universe 18 manually. When an acquired resource is made available in the virtual universe, resource manager 28 can assign the resource a unique identifier and store the resource in a virtual universe database 30.

If the resource manager 28 temporarily holds the object pending return to the virtual universe 18 and/or requires any resource modification for the virtual universe 18, the resource may be kept in temporary storage in the VU database 30.

In addition to that described above, resource access system 20 may also be utilized to capture and acquire resources from the virtual universe and bring them back to the client computer 36.

Furthermore, resource access system 20 may include a facility for allowing the user 32 to grant permission to other users/avatars to access resources from client computer 36. Various security controls such as access control lists (ACL), authentication challenges, etc., may be implemented to protect the user 32 from malicious or unwanted use. For example, user 32 may grant another user a time-limited ability to print a document to the user's printer or access the user's media player.

Figure 2:
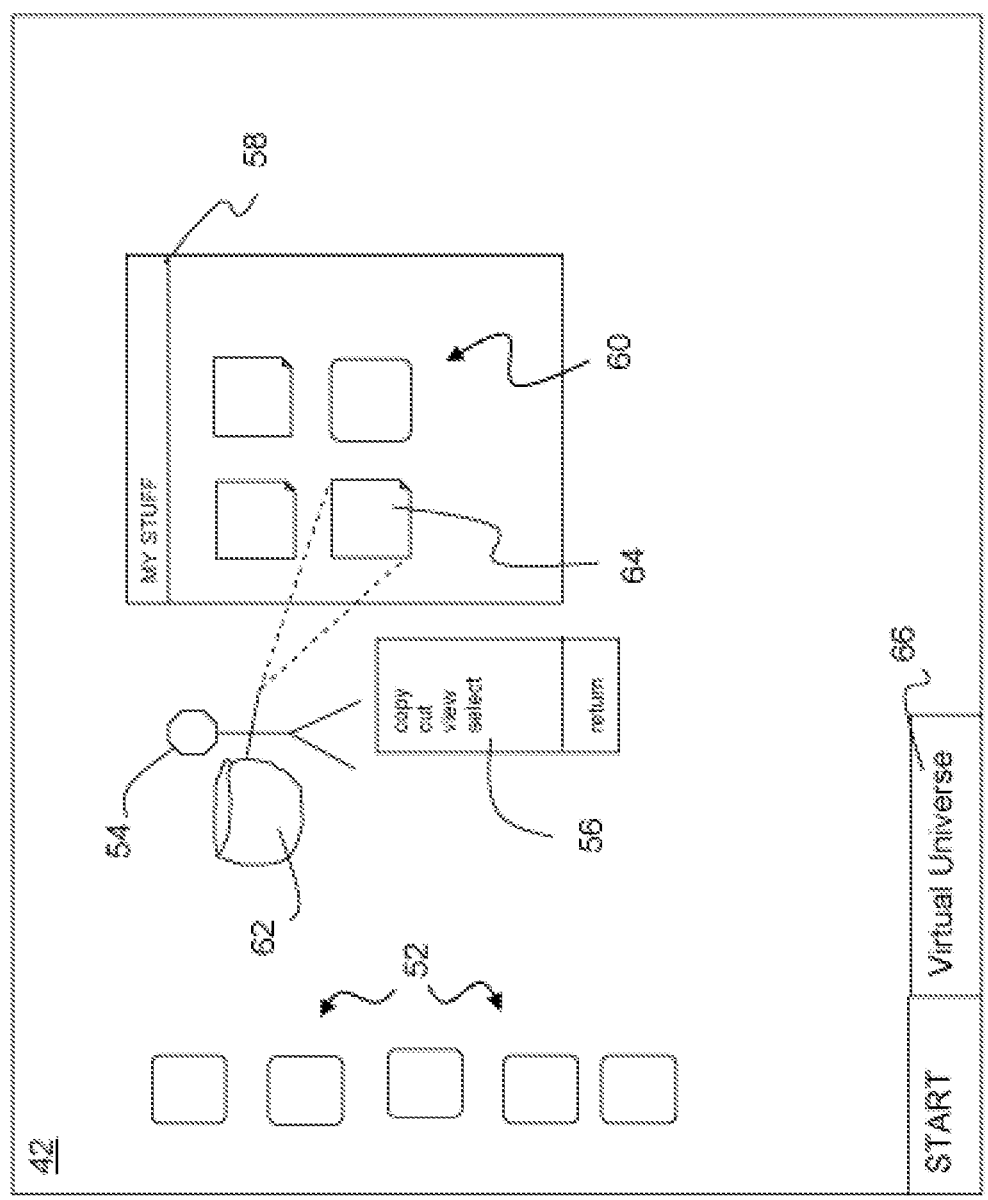
FIG. 2 depicts a desktop being explored by an avatar in accordance with an embodiment of the present invention.

FIG. 2 depicts an illustrative embodiment of a desktop interface 42 rendered by local OS invocation system 22 (FIG. 1). Desktop interface 42 includes those items typically found on a computer interface, including a plurality of icons 52, an explorer window ("MY STUFF"), etc. In addition, an avatar 54 is depicted, which is controllable by the end user to navigate and explore the desktop 50. In this example, the avatar 54 includes a sack into which resources can be collected for use back in the virtual universe. In this case, avatar 54 has selected a file 64 from the explorer window. Using, e.g., a right mouse click, an action menu 56 is displayed that allows the avatar to take some action, such as copying the selected file 64 to the sack. Once the user is ready to return to the virtual universe, the user can, e.g., selected "return" from the action menu 56, navigate the avatar to the taskbar icon 66 for the virtual universe, etc. FIG. 2 depicts one possible implementation, and clearly, many others are possible and fall within the scope of the invention.

Figure 3:
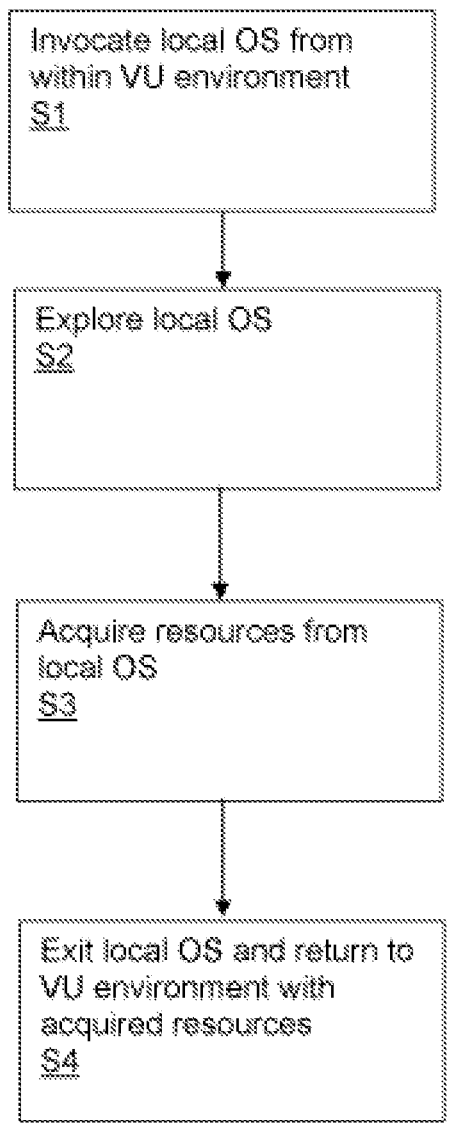
FIG. 3 depicts a flow diagram of a method in accordance with an embodiment of the present invention.

FIG. 3 depicts a flow diagram of an illustrative method of the invention. At S1, the local OS is invocated from within the VU environment. At S2, the user uses his or her avatar to explore the local OS. At S3, resources are acquired from the local OS. At S4, the user exits the local OS and returns to the VU environment with acquired resources.

Referring again to FIG. 1, VU server system 10 is shown as including a processing unit 12, a memory 16, at least one input/output (I/O) interface 14, and a bus 17. Further, the VU server system 10 may also include other facilities such as external devices and storage systems. In general, the processing unit 12 executes computer program code, such as virtual universe 18, that is stored in memory 16. While executing computer program code, the processing unit 12 can read and/or write data from/to the memory 16, a storage system, and/or I/O interface(s) 14. Bus 17 provides a communication link between each of the components in the computer system 10. External device(s) can comprise any device (e.g., display) that enables a user 32 to interact with the VU server system 10 or any device that enables the VU server system 10 to communicate with one or more other computer systems. Client computer 36 may include similar features.

Both client computer 36 and VU server system 10 can comprise any general purpose computing article of manufacture capable of executing computer program code installed thereon (e.g., a personal computer, server, handheld device, etc.). However, it is understood that the VU server system 10 is only representative of various possible computer systems that may perform the various processes of the invention. To this extent, in other embodiments, the client computer 36 and VU server system 10 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the virtual world platform shown in FIG. 1 is only illustrative of various types of platforms that can be used to implement the present invention. For example, in an embodiment, the VU server system 10 can comprise two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that the various systems can be implemented independently, combined, and/or stored in memory for one or more separate computer systems that communicate over a network. Further, it is understood that some of the systems and/or functionality may not be implemented, or additional systems and/or functionality may be included as part of the invention.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 36 and/or a storage system (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a VU server system 10 that performs the processes of the invention for one or more customers. In return, the service provider can receive payment from the customer(s) under a subscription and/or fee agreement and/or the service provider can receive payment from the sale of advertising space to one or more third parties.

In still another embodiment, a virtual universe 18 can be obtained (e.g., created, maintained, having made available to, etc.) and one or more systems for performing the processes of the invention can be obtained (e.g., created, purchased, used, modified, etc.) and deployed. To this extent, the deployment of each system can comprise one or more of (1) installing program code on a client computer 36, from a computer-readable medium; (2) adding one or more computer systems to the computer infrastructure; and (3) incorporating and/or modifying one or more existing systems of a computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and clearly, many modifications and variations are possible.

What is claimed is:

1. A computer system for acquiring resources from a client computer during a user session with a virtual universe, comprising:
    at least one processing unit;
    memory operably associated with the at least one processing unit;
    a resource access system storable in memory and executable by the at least one processing unit, the resource access system comprising:
    computer program code for invoking a local desktop session that displays a desktop interface onto a client computer during the user session with the virtual universe, wherein the desktop interface on the client computer has a boundary that is separate and distinct from a boundary associated with the virtual universe, the user session with the virtual universe being paused in response to invoking the local desktop session, wherein an avatar of a user from the virtual universe is rendered on the desktop interface;
    computer program code for enabling the avatar to navigate within the desktop interface using user-manipulated avatar controls;
    computer program code for permitting the avatar to acquire resources from the client computer by selecting a file from a window via the desktop interface through an action menu that allows the avatar to copy the selected file to an inventory associated with the avatar using the user-manipulated avatar controls, wherein the desktop interface displays the avatar acquiring the resources while rendered thereon;
    computer program code for enabling the avatar to return to the virtual universe session with the acquired resources from the desktop interface by selecting a return action from the action menu using the user-manipulated avatar controls; wherein the local desktop session is terminated when the user session with the virtual universe session is reestablished; and
    computer program code for managing acquired resources upon return to the virtual universe; wherein the computer program code for managing acquired resources assigns acquired resources a unique identifier and loads the acquired resources into a virtual universe database.

2. The computer system of claim 1, further comprising a virtual universe client running on the client computer.

3. The computer system of claim 1, further comprising computer program code for acquiring resources from the virtual universe and loading acquired resources to the client computer.

4. A method for acquiring resources from a client computer during a user session with a virtual universe, comprising:
    invocating a local desktop session that displays a desktop interface onto a client computer during the user session with the virtual universe, wherein the desktop interface on the client computer has a boundary that is separate and distinct from a boundary associated with the virtual universe, the user session with the virtual universe being paused in response to invoking the local desktop session, wherein an avatar of a user from the virtual universe is rendered on the desktop interface;
    enabling the avatar to navigate within the interface using user manipulated avatar controls;
    permitting the avatar to acquire resources from the client computer by selecting a file from a window via the desktop interface through an action menu that allows the avatar to copy the selected file to an inventory associated with the avatar using the user-manipulated avatar controls, wherein the desktop interface displays the avatar acquiring the resources while rendered thereon;
    enabling the avatar to return to the virtual universe session with the acquired resources from the desktop interface by selecting a return action from the action menu using the user-manipulated avatar controls, wherein the local desktop session is terminated when the user session with the virtual universe is reestablished; and
    managing acquired resources upon return to the virtual universe session, wherein managing acquired resources assigns acquired resources a unique identifier and loads the acquired resources into a virtual universe database.

5. The method of claim 4, further comprising acquiring resources from the virtual universe and loading acquired resources to the client computer.

6. A program product stored on a non-transitory computer-readable medium for acquiring resources from a client computer during a user session with a virtual universe, comprising:
    program code for invoking a local desktop session that displays a desktop interface onto a client computer during the user session with the virtual universe, wherein the desktop interface on the client computer has a boundary that is separate and distinct from a boundary associated with the virtual universe, the user session with the virtual universe being paused in response to invocating the local desktop session, wherein an avatar of a user from the virtual universe is rendered on the desktop interface;

program code for enabling the avatar to navigate within the desktop interface using user-manipulated avatar controls;

program code for permitting the avatar to acquire resources from the client computer by selecting a file from a window via the desktop interface through an action menu that allows the avatar to copy the selected file to an inventory associated with the avatar using the user-manipulated avatar controls, wherein the desktop interface displays the avatar acquiring the resources while rendered thereon;

program code for enabling the avatar to return to the virtual universe with the acquired resources from the desktop interface by selecting a return action from the action menu using the user-manipulated avatar controls, wherein the local desktop session is terminated when the user session with the virtual universe is reestablished; and program code for managing acquired resources upon return to the virtual universe, wherein the program code for managing acquired resources assigns acquired resources a unique identifier and loads the acquired resources into a virtual universe database.

7. The program product of claim 6, further comprising program code for acquiring resources from the virtual universe and loading acquired resources to the client computer.

8. The computer system according to claim 1, wherein the acquired resources are stored in the inventory associated with the avatar upon returning to the virtual universe with the acquired resources from the desktop interface.

9. The method according to claim 4, further comprising storing the acquired resources in the inventory associated with the avatar upon returning to the virtual universe with the acquired resources from the desktop interface.

10. The program product according to claim 6, further comprising program code for storing the acquired resources in the inventory associated with the avatar upon returning to the virtual universe session with the acquired resources from the desktop interface.

* * * * *